United States Patent [19]

Swett

[11] 3,891,630

[45] June 24, 1975

[54] SUBSTITUTED PYRAZOLO[3,4-E][1,4]THIAZEPINES AND ISOXAZOLO[5,4-E][1,4]THIAZEPINES

[75] Inventor: Leo Ralph Swett, Waukegan, Ill.

[73] Assignee: Abbott Laboratories, North Chicago, Ill.

[22] Filed: Mar. 4, 1974

[21] Appl. No.: 448,086

[52] U.S. Cl.... 260/239.3 B; 260/307 H; 260/310 R; 424/272; 424/273; 424/275
[51] Int. Cl. ...................... C07d 99/10; C07d 99/00
[58] Field of Search .............................. 260/239.3 B Primary Examiner—Henry R. Jiles
Assistant Examiner—Robert T. Bond
Attorney, Agent, or Firm—Paul D. Burgauer; Robert L. Niblack

[57] ABSTRACT

1-H Pyrazolo[3,4-e][1,4]thiazepin-7(8H)-ones which may be substituted in the 1, 3, 4, 6 and 8-position, and the corresponding isoxazolo[5,4-e][1,4]thiazepin-7(8H)-ones which may be substituted in the 3, 4, 6 and/or 8-position are prepared by converting 5-aminopyrazole which may be substituted in the 1- and/or 3-positions or a 5-aminoisoxazole which may be substituted in the 3-position into 4-arylidene or alkylidine-5-imino derivatives and subsequent condensation with thioglycolic acid or a substituted thioglycolic acid. The new compounds are useful anti-inflammatories.

11 Claims, No Drawings

SUBSTITUTED PYRAZOLO[3,4-E][1,4]THIAZEPINES AND ISOXAZOLO[5,4-E][1,4]THIAZEPINES

DETAILED DESCRIPTION OF THE INVENTION

The present invention is directed to a new process for making compounds of heretofore unknown ring systems; more particularly, this invention is concerned with the preparation of compounds of the formula:

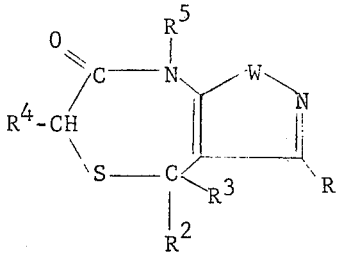   I wherein W is NR¹, or O and R is hydrogen, loweralkyl or phenyl, R¹ is hydrogen, loweralkyl, phenyl or cyclohexyl, R² is lower-alkyl, cyclopropyl, 2-furyl or

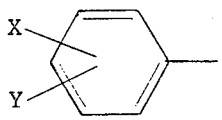   II wherein X is hydrogen, halogen, trifluoromethyl, hydroxy, loweralkoxy or dimethylamino and Y is hydrogen, chlorine or loweralkoxy, R³ is hydrogen or loweralkyl, R⁴ is hydrogen, loweralkyl or carboxyloweralkyl and R⁵ is hydrogen, loweralkyl or diloweralkylaminoloweralkyl. In all instances, the term "loweralkyl" or "loweralkoxy" is intended to refer to saturated hydrocarbon chains of 1 – 7 carbon atoms. The new compounds are useful anti-inflammatories, producing a marked reduction of edema when orally administered to warm-blooded animals at a dosage of between 5 and 100 mg./kg. The compounds wherein R² and/or R³ is hydrogen and W is NR¹ can also be used as the precursors for compounds of the formula:

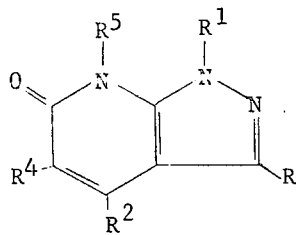

wherein R, R¹, R², R⁴ and R⁵ have the above-defined meaning. These pyrazolopyridinones have also been found to have excellent anti-inflammatory activity in warm-blooded animals.

In a general embodiment of the new process, a compound of the formula:

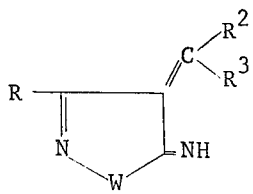   III wherein W, R, R² and R³ have the above-identified meaning is condensed with a molar equivalent of a thioglycolic acid (mercaptoacetic acid) of the formula:

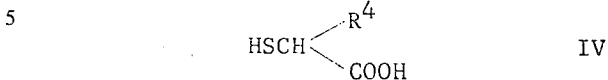   IV wherein R⁴ has the meaning defined above, in the presence of an inert solvent boiling above 50° C. at a temperature between 60° and 150° C. for a period of between 30 minutes and several hours and recovering the formed isoxazolo- or pyrazolothiazepinone from the reaction mixture. The compounds wherein R⁵ is different from hydrogen are made from the compounds wherein R⁵ is hydrogen by well-known procedures. The term "inert" used in defining the reaction medium for the above condensation is meant to express that the solvent does not react with either starting material or the formed condensation product. Where the solvent used in the condensation reaction described above is water-immiscible, it is preferred to use a reaction vessel permitting the continuous removal of water during the reaction; when the inert solvent used as the reaction medium is water-miscible, the condensation product can easily be isolated by partial evaporation of said solvent and crystallization of the condensation product. Suitable reaction solvents are aromatic hydrocarbons like benzene, xylene, etc. and alcohols such as ethanol, butanol, etc.

In a minor modification of the outlined general procedure for making the new compounds of formula I, the corresponding substituted 5-aminopyrazole or isoxazole is reacted wiwth an aldehyde of formula R²CH = O, or a ketone of formula R₂R₃C = O in an inert solvent to give the appropriate 4-arylidene or alkylidene-5-imino derivatives of formula III, analogous to the reactions described for making substituted 5-pyrazolones [Tetrahedron 29, 2635–44 (1973)]. The selected thioglycolic acid of formula IV is subsequently added to the formed 4-substituted 5-imino-isoxazole or -pyrazole with or without isolation of this intermediate for the final condensation leading to the desired isoxazolo- or pyrazolothiazepinone.

EXAMPLE 1 a. In a condensation apparatus equipped with a water separator, 3.23 g. of 4-benzylidene-1,3-diphenyl-5-iminopyrazoline and 1.1 g. of thioglycolic acid are placed in 50 ml. of benzene and refluxed for five hours after which time the solvent is removed in vacuo. The residue is taken up in ether and hexane is added to this solution until it becomes turbid. The mixture is allowed to stand over night, producing a precipitate weighing 1.3 g. and melting at 182° – 193° C. This precipitate is recrystallized from benzene/hexane in the above fashion to produce pure 1,3,4-triphenyl-1H-pyrazolo[3,4-e][1,4]thiazepin-7(8H)-one, melting at 197° – 199° C.

b. When in the above example 44 g. of the 4-benzylidene-1,3-diphenyl-5-iminopyrazoline is condensed with 17.8 g. of thioglycolic acid in 150 ml. of toluene by refluxing the mixture for three hours and concentrating the volume thereafter to about one third, the addition of ether precipitates 35 g. (65% of theory) of the above pyrazolothiazepinone.

EXAMPLE 2

By using the procedure described in Example 1b, the condensation of 19.9 g. of 4-benzylidene-1,3-diphenyl-5-iminopyrazoline and 9.2 g. of thioglycolic acid in 75 ml. of toluene, 16.8 g. of 1,3-dimethyl-4-phenyl-1H-pyrazolo[3,4-e] [1,4]thiazepin-7(8H)-one, melting at 205° – 207° C. is obtained.

EXAMPLE 3

By following the procedure of Example 1b using 16.2 g. of 4-benzylidene-1,3-diphenyl-5-iminopyrazoline and 5.9 g. of mercaptosuccinic acid in 150 ml. of toluene, a clear solution forms after about 30 minutes of refluxing. Upon continued refluxing, a precipitate starts to form. After another 60 minutes, the mixture is cooled and the toluene is decanted, leaving a yellow, sticky mass. After triturating this mass with ethanol, filtration and recrystallization from dimethylformamide/water, 3.6 g. of 6-carboxymethyl-1,3,4-triphenyl-1H-pyrazolo[3,4-e] [1,4]-thiazepine-7(8H)-one, melting at 253° – 255° C. is obtained.

EXAMPLE 4

By substituting the 5-iminopyrazoline of Example 1 with the corresponding 4-(4-chlorobenzylidene)-1,3-dimethyl-5-iminopyrazoline, condensation under reflux in toluene with water separation for five hours produces 4-(4-chlorophenyl)-1,3-dimethyl-1H-pyrazolo[3,4-e] [1,4]thiazepin-7(8H)-one in a yield of 63%. The pure compound melts at 204° – 206° C.

By using the corresponding 4-fluoro compound, the analogous 4-(4-fluorophenyl) derivative is obtained. The activity of this compound is established by the following procedure: edema is produced in the paws of rats by the injection of carrageenan according to the method described by Winter, et al., (Proc. Soc. Exp. Bioc. Med., 1962, Vol. 111, page 544). The above compound is administered orally at various dosages (six rats per dosage) 30 minutes prior to the administration of the edema producing carrigeenan. Edema is expressed as per cent increase over normal paw size; edema inhibition is calculated from the difference between the average edema size of a control group of animals and the average edema size of each test group. The $ED_{25}$ (i.e., the dose required to produce 25% edema size reduction) is determined from a dosage/effect curve drawn on logarithmic graph paper and is established at 25 mg./kg. for the above fluoro-compound; with 10 and 50 mg./kg., respectively, an edema reduction of 16% and 61% is obtained.

For the above chloro-compound, the experimentally caused edema are reduced by 20% after oral administration of 30 mg./kg. and 49% with 50 mg./kg.

EXAMPLE 5

By substituting the 5-iminopyrazoline used in Example 4 with 4-(3,4-dichlorobenzylidene)-1,3-dimethyl-5-iminopyrazoline, an equally good yield of 4-(3,4-dichlorophenyl)-1,3-dimethyl-1H-pyrazolo[3,4-e] [1,4]thiazepin-7(8H)-one is obtained. Upon oral administration of this compound to rats by the method shown in Example 4, edema reduction by 38% and 61% are found with 10 mg./kg. and 25 mg./kg., respectively.

EXAMPLES 6 – 30

In the following examples, the procedure of Example 1b is repeated using other iminopyrazolines of above formula III (W=>NR$^1$) with R, R$^1$, R$^2$ and R$^3$ as identified in the following table, a thioglycolic acid of formula IV with R$^4$ as identified below and the indicated solvent. The compounds so prepared are identified below with their melting point and their chemical name in which Z is used as abbreviation for 1H-pyrazolo[3,4-e]-[1,4]thiazepin-7(8H)-one.

| Ex. No. | R | R$^1$ | R$^2$ | R$^3$ | R$^4$ | (Solvent) | M.P. °C. | Name |
|---|---|---|---|---|---|---|---|---|
| | | | HSCHR$^4$COOH | | | | Resulting Compound | |
| 6 | CH$_3$ | CH$_3$ | 2,4-Cl$_2$-C$_6$H$_3$- | H | H | (toluene) | 280-2° | 4-(2,4-dichlorophenyl)-1,3-dimethyl-Z |
| 7 | CH$_3$ | CH$_3$ | 4-Cl-C$_6$H$_4$- | H | CH$_2$COOH | " | 240-2° | 6-carboxymethyl-4-(4-chlorophenyl)1,3-dimethyl-Z |
| 8 | CH$_3$ | CH$_3$ | 4-F-C$_6$H$_4$- | H | H | (toluene) | 197-9° | 1,3-dimethyl-4-(4-fluorophenyl)-Z |
| 9 | CH$_3$ | CH$_3$ | 4-CF$_3$-C$_6$H$_4$- | H | H | (toluene) | 196-8° | 1,3-dimethyl-4-(4-trifluoromethylphenyl)-Z |

| Ex. No. | R | $R^1$ | $R^2$ | $R^3$ | HSCHR$^4$COOH $R^4$ | (Solvent) | Resulting Compound M.P. °C. | Name |
|---|---|---|---|---|---|---|---|---|
| 10 | $CH_3$ | $CH_3$ | -C$_6$H$_3$(HO)(OCH$_3$)- | H | H | (toluene) | 219-21° | 1,3-dimethyl-4-(2-hydroxy-3-methoxyphenyl)-Z |
| 11 | $CH_3$ | $CH_3$ | -C$_6$H$_3$(CH$_3$O)(OCH$_3$)- | H | H | (toluene) | 170-2° | 4-(2,3-dimethoxyphenyl)-1,3-dimethyl-Z |
| 12 | $CH_3$ | $CH_3$ | -C$_6$H$_4$-Cl | H | $CH_3$ | (toluene) | 210-1° | 4-(4-chlorophenyl)-1,3,5-trimethyl-Z |
| 13 | $CH_3$ | $CH_3$ | -C$_6$H$_4$-F | $CH_3$ | H | (toluene) | 206-8° | 4-(4-fluorophenyl)-1,3,4-trimethyl-Z |
| 14 | $CH_3$ | $CH_3$ | -C$_6$H$_4$-I | H | H | (toluene) | 215-7° | 1,3-dimethyl-4-(4-iodophenyl)-Z |
| 15 | Ph | $CH_3$ | -C$_6$H$_4$-Cl | H | H | (toluene) | 212-4° | 4-(4-chlorophenyl)-1-methyl-3-phenyl-Z |
| 16 | $CH_3$ | $CH_3$ | -C$_6$H$_4$-OH | H | H | (toluene) | 268-70° | 1,3-dimethyl-4-(4-hydroxyphenyl)-Z |
| 17 | $CH_3$ | $CH_3$ | 2-furyl | H | H | (toluene) | 185-7° | 1,3-dimethyl-4-(2-furyl)-Z |
| 18 | $CH_3$ | H | -C$_6$H$_4$-Cl | H | H | (toluene) | 280-2° | 4-(4-chlorophenyl)-3-methyl-Z |
| 19 | $CH_3$ | $CH_3$ | -C$_6$H$_4$-Cl | $CH_3$ | H | (toluene) | 248-50° | 4-(4-chlorophenyl)-1,3,4-trimethyl-Z |
| 20 | $CH_3$ | $CH_3$ | $CH_3$ | $CH_3$ | H | (toluene) | 188-90° | 1,3,4,4-tetramethyl-Z |
| 21 | $CH_3$ | 3-MeBu | -C$_6$H$_4$-F | H | H | (toluene) | 160-2° | 3-methyl-1-(3-methylbutyl)-4-(4-fluorophenyl)-Z |
| 22 | $CH_3$ | $CH_3$ | -C$_6$H$_4$-NMe$_2$ | H | H | (toluene) | 206-9° | 1,3-dimethyl-4-(4-dimethylaminophenyl)-Z |
| 23 | $CH_3$ | $CH_3$ | Pr | H | H | (toluene) | 113-15° | 1,3-dimethyl-4-propyl-Z |
| 24 | $CH_3$ | $CH_3$ | cyclopropyl | $CH_3$ | H | (benzene) | 151-3° | 4-cyclopropyl-1,3,4-trimethyl-Z |

| Ex. No. | R | R¹ | R² | R³ | R⁴ HSCHR⁴COOH (Solvent) | M.P. °C. | Resulting Compound Name |
|---|---|---|---|---|---|---|---|
| 25 | CH₃ | CH₃ | -<Ph>-Br | H | H (toluene) | 204-6° | 4-(4-bromophenyl)-1,3-dimethyl-Z |
| 26 | H | Ph | -<Ph>-Cl | H | H (toluene) | 169-71° | 4-(4-chlorophenyl)-1-phenyl-Z |
| 27 | H | Ph | -<Ph>-F | H | H (toluene) | 191-93° | 4-(4-fluorophenyl)-1-phenyl-Z |
| 28 | H | <S> | -<Ph>-F | H | H (toluene) | 170-3° | 1-cyclohexyl-4-(4-fluorophenyl)-Z |
| 29 | H | CH₃ | -<Ph>-F | H | H (toluene) | 212-3° | 4-(4-fluorophenyl)-1-methyl-Z |
| 30 | H | CH₃ | CH₃ | CH₃ | H (toluene) | 205.5-7° | 1,4,4-trimethyl-Z |

In all of the above examples, except No. 6, the procedure of example 1b is used without isolation of the intermediate 4-arylidene or alkylidene-5-iminopyrazoline. The solvent indicated above is used to condense the pyrazole with the aldehyde or ketone and after refluxing the mixture for at least two hours, the thioglycolic acid is added for the final condensation reaction.

In the following examples, compounds of formula 1 wherein R⁵ is different from hydrogen are made from compounds described in previous examples.

EXAMPLE 31

To a solution of 5.82 g. of the compound of Example 8 in 50 ml. of water containing 0.8 g. of sodium hydroxide, 2.52 g. of dimethylsulfate is added. After the initial foaming subsides, an oil separates. An additional amount of 0.5 g. dimethylsulfate is added and the mixture is stirred two hours at room temperature. The oil is separated by adding chloroform and removal of the aqueous phase. The chloroform solution is washed with water and dried. The solvent is removed by vacuum distillation. The oil solidifies, it is triturated with ether and the solid is separated by filtration, leaving 2.6 g. of crude 1,3,8-trimethyl-4-(4-fluorophenyl)-1H-pyrazolo[3,4-e]-[1,4]thiazepin-7(8H)-one. The pure compound, recrystallized from dimethylformamide/water, melts at 125°-7°.

EXAMPLE 32

In the manner described in Example 31, the compound of Example 5 is converted to 1,3,8-trimethyl-4-(3,4-dichlorophenyl)-1H-pyrazolo[3,4-e] [1,4]thiazepin-7(8H)-one, melting at 165°-7°. A yield of 76% of theory is observed.

EXAMPLE 33

A mixture of 5.82 g. of the pyrazolothiazepinone of Example 8 and 1.92 g. of a 50% dispersion of sodium hydride in oil is stirred for one hour at room temperature in 50 ml. of dimethylformamide and, subsequently, 2.88 g. of dimethylaminoethyl chloride hydrochloride is added. The mixture is stirred for three hours at 70° C. and water is then added cautiously to destroy any excess of sodium hydride. After gas evaluation subsides, the mixture is filtered and the residue is dried in vacuum. The oily residue is placed in a mixture of chloroform and water. The chloroform layer is washed with water and then extracted with dilute hydrochloric acid solution. Again, the chloroform layer is separated, then dried and concentrated. The residue solidifies and is identified as unreacted starting material. The acid fraction is made basic by adding a 50% aqueous sodium hydroxide solution which is then extracted with chloroform. The chloroform layer is separated, washed with water, dried and concentrated to produce an oil. The oil is dissolved in ether and ethereal hydrochloric acid is added, producing 4.2 g. of a residue melting at 193°-7° C. with decomposition. After crystallization from ethanol/ether, 2.2 g. of pure 1,3-dimethyl-8-(2-dimethylaminoethyl)-4-(4-fluorophenyl)-1H-pyrazolo[3,4-e]-[1,4]thiazepin-7(8H)-one dihydrochloride melting at 238°–40° C. is obtained.

This hydrochloric acid salt is dissolved in water and made alkaline by adding a 10% aqueous sodium hydroxide solution. The solid obtained is filtered, washed with water, dried and crystallized from hexane yielding the free base of the above compound having a melting point of 110°-12° C. and showing analytical values in good agreement with those calculated for the compound of empirical formula: $C_{18}H_{23}FN_4OS$.

EXAMPLE 34

A mixture of 14.7 g. 3-methyl-5-aminoisoxazole, 21.1 g. of 4-chlorobenzaldehyde and 200 ml. of toluene are refluxed in an apparatus equipped with a water separator. After three hours, the mixture is cooled and 13.85 g. of thioglycolic acid is added. Refluxing is continued for another two hours and subsequently, toluene is driven off to reduce the volume to about 180 ml. Upon cooling, a dark brown oil separates. The toluene solution is decanted and the oil triturated with an equal volume of ether, cooled over night, and decanted again. The toluene/ether mixture is evaporated to dryness, leaving 37.3 g. of a clear, hard, light orange residue. Several recrystallizations of this product from ethanol produces pure 4-(4-chlorophenyl)-3-methylisoxazolo[5,4-e] [1,4]thiazepin-7(8H)-one, melting at 218°–20° C. Edema in rats is reduced by 44% upon administration of 25 mg./kg. of this compound.

EXAMPLE 35

A mixture of 25 g. of 3-methyl-5-aminoisoxazole and 26.5 g. of benzaldehyde is refluxed for three hours in 50 ml. of ethanol. The solvent is then evaporated and the crude residue is refluxed for three hours with 23 g. of thioglycolic acid in 100 ml. of toluene, using a water separator. Subsequently, hot hexane is added and the mixture is then allowed to stand for several days during which time the oil initially separating starts to crystallize. The solvent mixture is decanted and ethanol is added. Upon stirring, the remaining oil crystallizes. The crystals are filtered off, washed with ether and recrystallized from 500 ml. ethanol to produce pure 3-methyl-4-phenylisoxazolo-[5,4-e] [1,4]thiazepin-7(8H)-one, melting at 216°–18° C.

EXAMPLE 36

In a repetition of the process of Example 34 but using 18.62 g. of 4-fluorobenzaldehyde in place of the 4-chlorobenzaldehyde, the expected 4-(4-fluorophenyl)-3-methylisoxazolo-[5,4-e] [1,4]thiazepin-7(8H)-one, melting at 219°–21° C. is obtained. The $ED_{40}$ of this compound is 50 mg./kg.

EXAMPLE 37

Using an equivalent amount of 3,4-dichlorobenzaldehyde in place of the 4-chlorobenzaldehyde used in Example 34, 4-(3,4-dichlorophenyl)-3-methylisoxazolo[5,4-e] [1,4]thiazepin-7(8H)-one, melting at 245°–9° C. (recrystallized from dimethylformamide/water) is obtained. Upon oral administration of 50 mg./kg. of this compound to rats, their edema size is reduced by 28%.

EXAMPLE 38

In a repetition of Example 34 but using 4-chloroacetophenone as the starting material, 4-(4-chlorophenyl)-3,4-dimethylisoxazolo[5,4-e] [1,4]thiazepin-7(8H)-one is obtained. The product melts, after several recrystallizations from dimethylformamide/water, at 280°–95° with decomposition.

EXAMPLE 39

In the fashion of the above example but using acetone for making 4-isopropylidine-3-methyl-5-iminoisoxazole, 3,4,4-trimethylisoxazolo[5,4-e] [1,4]thiazepin-7(8H)-one melting at 197.5°–8.5° C. is obtained. This compound reduces the size of an edema by 8% when administered orally at a dose of 50 mg./kg. to rats.

EXAMPLE 40

To a solution of 2.95 g. of the compound prepared in Example 34 in 25 ml. of 20% aqueous sodium hydroxide, a few drops of 50% aqueous sodium hydroxide is added to make the solution strongly alkaline. Dimethylsulfate (1.26 g.) is then added at once. Within less than a minute, a crystalline solid separates from the stirred solution. After two hours stirring at room temperature, the hard crystals are filtered off, washed with water and dried in air, yielding 1.7 g. of crude 4-(4-chlorophenyl)-3,8-dimethylisoxazolo[5,4-e] [1,4]thiazepin-7(8H)-one. This product is recrystallized from ethanol/water; it melts at 102°–6° C. and is obtained in long, white needles. Oral administration of 50 mg./kg. of this compound to rats with edema produces a 12% edema size reduction.

As mentioned, substituting the free hydrogen in the 8-position of the compounds of formula I can be accomplished by known and standard methods as exemplified above. However, the molar ratio between the pyrazolothiazepinone and the alkylating agent should not exceed the proportion 1:1 because when the alkylating reagents used exceed the equimolar porportion, an entirely different ring structure is obtained. For instance, by carrying out the procedure of Example 33 with the starting material described in Example 5 but using two molar equivalents of sodium hydride and two molar equivalents of methyl iodide, 4-(3,4-dichlorophenyl)-1,7-dihydro-1,3,7-trimethyl-pyrazolo-[3,4-b]pyridin-4-one is obtained; it melts at 200°–202° C. after crystallization from dimethylformamide/water. As mentioned above, this compound is also useful as an anti-inflammatory for warm-blooded animals. An oral dose of 85 mg./kg. reduces edema size by 25%.

In a similar manner, the free base of Example 8 converts to 4-(4-fluorophenyl)-6,7-dihydro-1,3,7-trimethyl-pyrazolo-[3,4-b]pyridin-6-one when two molar equivalents of sodium hydride and methyl iodide are used. This compound melts at 185°–7° C. and when applied orally at a dose to 56 mg./kg. to rats, an edema size reduction of 25% is observed.

The new pyrazolothiazepinones described above are thus useful in the field of anti-inflammatories in two ways. They can be used directly, or they may be used as the starting materials for making other valuable anti-inflammatory compounds by the described ring contraction process. The described isoxazolo- and pyrazolothiazepines of formula I both produce significant edema reduction when orally administered in dosages between 5 and 100 mg./kg. These dosages are extremely small when considered in view of their toxicities. In most instances, the oral $LD_{50}$ is well above 500 mg./kg. and often >1000 mg./kg. which reflects the excellent therapeutic index of these compounds. An excellent therapeutic index is also apparent for the compounds with the pyrazolopyridinone structure made from the above pyrazolothiazepines. Their oral $LD_{50}$ values are mostly >1000 mg./kg.

In biologically evaluating the compounds of the new series, another very interesting observation was made. The compounds described in Examples 4, 5, 8, 14, 25, 34 and 37 possess pronounced antidepressant activity. For instance, the compound of Example 4 produces a 3+ rating on a 0 – 3 activity scale in the modified DOPA test described by G. Everett in "Proceedings of the First International Symposium on Antidepressent Drugs" (published by Excerpta Medica Foundation, Amsterdam, February 1967, page 164) when administered orally at a dose of 25 mg./kg. to rats, while showing no monoamineoxidase inhibition at doses between 25 and 200 mg./kg. The combination of stimulant (antidepressant) and anti-inflammatory activity is of great value, particularly in the field of veterinary medicine.

The compounds described in Examples 4, 5, 8, 14, 25, 34 and 37 of this invention have also been found to enhance performance when administered orally to slow learners in dosages of from 10 to 80 mg./kg. of body weight daily. The compounds facilitate the acquisition of conditioned avoidance behavior and the retention of learning in rats following electroconvulsive shock in the Sidman shock avoidance procedure.

The new compounds of formula I can be effectively administered orally and some representatives also are effective through other routes of administration, e.g., through injections or topical. For oral administration, the compounds may be suspended or dissolved in a pharmaceutically acceptable medium or they can be combined with a pharmaceutically acceptable solid carrier for the preparation of pills, capsules or tablets. For either the liquid or solid dosage form, the free base of the above compounds as well as their nontoxic acid addition salts may be used. The preferred salts for this purpose are the hydrochloride, the sulfate, the citrate, the phosphate or the acetate. These salts may be used alone or combinations of salts may be used to produce specific effects. For instance, a readily absorbable salt and a slowly dissolving salt may be combined into a combination product giving fast and long-lasting effects, respectively. The salts, of course, may be based on different compounds of formula I or the free base of one compound may be combined with a salt of another representative of this new class of compounds.

We claim:

1. The process of preparing an isoxazolo[5,4-e]-[1,4]- or a pyrazolo[3,4-e] [1,4]thiazepinone of the formula:

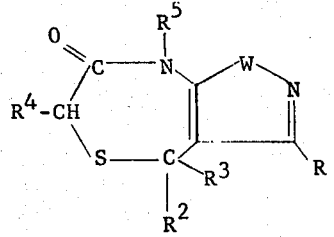   I wherein W is >O or >N-R$^1$, and wherein R is hydrogen, loweralkyl or phenyl, R$^1$ is hydrogen, loweralkyl, phenyl or cyclohexyl, R$^2$ is loweralkyl, cyclopropyl, 2-furyl or

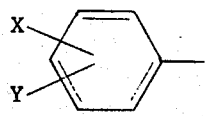   II wherein X is hydrogen, halogen, trifluoromethyl, hydroxy, loweralkoxy or dimethylamino and Y is hydrogen, chlorine or loweralkoxy, R$^3$ is hydrogen or loweralkyl, R$^4$ is hydrogen, loweralkyl or carboxyloweralkyl and R$^5$ is hydrogen, consisting essentially in condensing a compound of the formula:

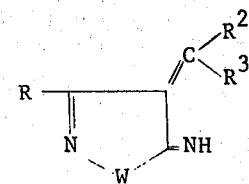   III wherein W, R, R$^2$ and R$^3$ have the above meaning, with a thioglycolic acid of the formula:

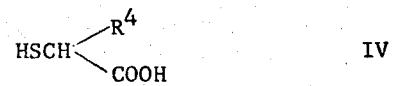   IV wherein R$^4$ has the above meaning, in the presence of an inert solvent boiling above 50° C. at a temperature between 60° and 150° C. for a period of at least 30 minutes.

2. The process of claim 1 wherein said inert solvent is ethanol.

3. The process of claim 1 wherein said inert solvent is toluene.

4. The process of claim 1 wherein said compound of formula III is formed in situ by condensing an aminopyrazole or an aminoisoxazole of the formula

with a carbonyl compound of the formula:
R$^2$R$^3$CO
in an inert solvent selected from the group consisting of ethanol, benzene and toluene.

5. A substituted pyrazolo[3,4-e] [1,4]thiazepinone or an isoxazolo[5,4-e] [1,4]thiazepinone of the formula:

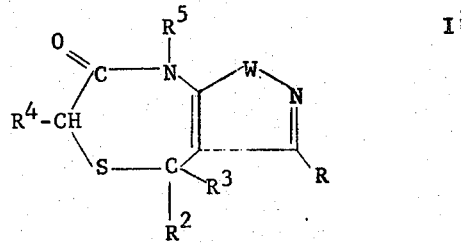   I wherein W is >O or >NR$^1$, R is hydrogen, loweralkyl or phenyl, R$^1$ is hydrogen, loweralkyl, phenyl or cyclohexyl, R$^2$ is lower-alkyl, cyclopropyl, 2-furyl or

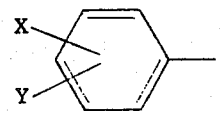   II wherein X is hydrogen, halogen, trifluoromethyl, hydroxy, loweralkoxy or dimethylamino and Y is hydrogen, chlorine or loweralkoxy, R$^3$ is hydrogen or loweralkyl, R$^4$ is hydrogen, loweralkyl or carboxyloweralkyl and R$^5$ is hydrogen, loweralkyl or diloweralkylaminoloweralkyl.

6. The compound of claim 5 wherein W is >NR$^1$, R and R$^1$ are methyl, R$^2$ is 4-chlorophenyl and R$^3$, R$^4$ and R$^5$ are hydrogen.

7. The compound of claim 5 wherein W is $>NR^1$, R and $R^1$ are methyl, $R^2$ is 4-fluorophenyl, and $R^3$, $R^4$ and $R^5$ are hydrogen.

8. The compound of claim 5 wherein W is $>NR^1$, R and $R^1$ are methyl, $R^2$ is 3,4-dichlorophenyl and $R^3$, $R^4$ and $R^5$ are hydrogen.

9. The compound of claim 5 wherein W is $>O$, R is methyl, $R^2$ is 4-chlorophenyl and $R^3$, $R^4$ and $R^5$ are hydrogen.

10. The compound of claim 5 wherein W is $>O$, R is methyl, $R^2$ is 3,4-dichlorophenyl and $R^3$, $R^4$ and $R^5$ are hydrogen.

11. The compound of claim 5 wherein W is $>NR^1$, R and $R^1$ are methyl, $R^2$ is 4-iodophenyl and $R^3$, $R^4$ and $R^5$ are hydrogen.

* * * * *